United States Patent [19]

Bernard

[11] Patent Number: 5,278,227
[45] Date of Patent: Jan. 11, 1994

[54] EMULSION PRESSURE-SENSITIVE ADHESIVE POLYMERS EXHIBITING EXCELLENT ROOM- AND LOW-TEMPERATURE PERFORMANCE

[75] Inventor: Margaret M. Bernard, La Verne, Calif.

[73] Assignee: Avery Dennison Corporation, Pasadena, Calif.

[21] Appl. No.: 964,434

[22] Filed: Oct. 21, 1992

Related U.S. Application Data

[60] Division of Ser. No. 567,141, Aug. 14, 1990, Pat. No. 5,164,444, which is a continuation-in-part of Ser. No. 393,970, Aug. 14, 1989, abandoned.

[51] Int. Cl.$^5$ .............................................. C08L 41/00
[52] U.S. Cl. ................................... 524/817; 524/240; 524/833; 522/153; 526/87; 526/318.43; 526/325; 526/931
[58] Field of Search ...................... 526/87, 318.43, 325, 526/931; 524/833, 240, 817; 522/153

[56] References Cited

U.S. PATENT DOCUMENTS

| | | | |
|---|---|---|---|
| 4,212,785 | 7/1980 | Turck | 526/317 |
| 4,354,008 | 10/1982 | Skoultchi | 525/370 |
| 4,564,664 | 1/1986 | Chang et al. | 524/833 |
| 4,759,983 | 7/1988 | Knutson et al. | |
| 4,908,403 | 3/1990 | Spada et al. | |

*Primary Examiner*—Joseph L. Schofer
*Assistant Examiner*—N. Sarofim
*Attorney, Agent, or Firm*—Christie, Parker & Hale

[57] ABSTRACT

There is provided inherently tacky, emulsion pressure-sensitive adhesive polymers comprising about 35 to about 65 percent by weight alkyl acrylates, about 15 to about 35 percent vinyl esters, about 20 to about 35 percent by weight diesters of a dicarboxylic acid, and up to about 5 percent by weight of an unsaturated carboxylic acid. There is preferably included in the monomers a reactive surfactant and a chelating monomer, with or without a chain transfer agent. The preferred polymers have a glass transition temperature less than about −30° C. and a gel content of about 50 to 70 percent by weight.

7 Claims, No Drawings

EMULSION PRESSURE-SENSITIVE ADHESIVE POLYMERS EXHIBITING EXCELLENT ROOM- AND LOW-TEMPERATURE PERFORMANCE

CROSS-REFERENCE TO RELATED APPLICATIONS

This is a division of application Ser. No. 07/567,141 filed Aug. 14, 1990, now U.S. Pat. No. 5,164,444, which is a continuation-in-part of application Ser. No. 07/393,970, filed Aug. 14, 1989, now abandoned.

BACKGROUND OF THE INVENTION

The present invention relates to polymers which are inherently tacky and, as formed, are functional as pressure-sensitive adhesives. More particularly, the adhesives of the instant invention have excellent room- and low-temperature performance and provide an ecologically safe replacement for solvent adhesives and many acrylic- and rubber-based emulsion adhesives. The adhesives of the instant invention are prepared by emulsion polymerization.

Adhesives are provided as solvent polymers, bulk polymers and emulsion polymers. Some exist as pressure-sensitive adhesives, while others require tackification to achieve this end.

In respect of the instant invention, U.S. Pat. No. 3,275,589 to Alexander, et al. pertains to an adhesive for adhering polyolefin and similar hydrophobic polymers to themselves and to other materials. The polymers disclosed are tacky, but not pressure-sensitive adhesives and are obtained by the polymerization of 100 parts by weight of a monomer mixture comprising 30 to 40 parts by weight vinyl acetate and, correspondingly, 60 to 70 parts by weight of (a) a monoalkyl ester of an alpha beta ethylenically unsaturated monocarboxylic acid such as 2-ethyl hexyl acrylate, or (b) a dialkyl ester of an alpha beta ethylenically unsaturated dicarboxylic acid such as 2-ethyl hexyl maleate, or (c) a mixture of the two. When three monomers are employed, the three illustrated include vinyl acetate, di-2-ethyl hexyl maleate and 2-ethyl hexyl acrylate.

U.S. Pat. Nos. 4,507,429, 4,694,056, and 4,725,639 to Lenney, and assigned to Air Products, Inc., pertain to a pressure-sensitive adhesive composition, and the products and method of making them, comprising a polymer of an acrylic ester and/or vinyl ester, an olefinically unsaturated carboxylic comonomer, and a polyolefinically unsaturated copolymerizable monomer employed to enhance the adhesive strength of the polymer. The polymer is formed by an aqueous emulsion polymerization in the presence of a stabilizer system containing hydroxy propyl methylcellulose and an ethoxylated acetylenic glycol. Product glass transition temperature may be as high as $-15°$ C., limiting utility at reduced temperature.

U.S. Pat. Nos. 4,753,846, 4,826,938 and 4,829,139, all to Mudge and assigned to National Starch & Chemical Corporation, pertain to an ethylene containing pressure-sensitive adhesive produced by high-pressure emulsion polymerization in which the adhesive comprises a polymer of 30 to 70 percent by weight of a vinyl ester of an alkyl acid such as vinyl acetate, 10 to 30 percent by weight of ethylene, 20 to 40 percent by weight of di-2-ethyl hexyl maleate, and 1 to 10 percent by weight of a monocarboxylic acid such as acrylic acid. Again, glass transition temperature may be as high as $-25°$ C., also limiting low-temperature utility.

U.S. Pat. No. 4,322,576 assigned to Wacker Chemie GmbH also pertains to ethylene containing vinyl acrylate polymers also produced and formed by high-pressure emulsion polymerization. Dialkyl esters of dicarboxylic acids are not employed as monomers.

We have sought to develop pressure-sensitive adhesives of controlled properties which serve to supplant a multitude of solution and emulsion polymers by having broad utility and excellent adhesive properties at ambient and low temperatures. This is the subject of the instant invention.

SUMMARY OF THE INVENTION

According to the present invention, there is provided inherently tacky acrylic emulsion adhesive polymers having excellent adhesion to a wide variety of surfaces ranging from polar, relatively high energy surfaces such as stainless steel to nonpolar, relatively low energy surfaces such as polyethylene and to difficult-to-bond surfaces such as corrugated board. Moreover, cohesion and adhesion at low temperatures is excellent and, when part of a laminate stock such as pressure-sensitive adhesive label stock, provides excellent high-speed converting characteristics such as die cutting, matrix stripping and fan folding. Superior properties are obtained even at lower-than-normal coat weights. In sum, the adhesive polymers are broad-based and serve to replace many solvent-based adhesives on an ecologically safe basis as well as many emulsion-based adhesives, thus serving a variety of markets.

The inherently tacky, emulsion pressure-sensitive adhesive polymers of the instant invention comprise, on a polymerized basis and based on the total weight of the polymer, at least one alkyl acrylate containing from about 4 to about 8 carbon atoms in the alkyl group, preferably 2-ethyl hexyl acrylate, said alkyl acrylate present in a total amount of from about 35 to about 60 percent by weight; at least one vinyl ester containing from 2 to about 16 carbon atoms in the alkyl chain of the acid, preferably vinyl acetate, said vinyl ester present in a total amount of from about 15 to about 35 percent by weight; at least one diester of a dicarboxylic acid wherein each alkyl group of the diester independently contains from about 6 to about 12 carbon atoms, with di-2-ethyl hexyl maleate or di-2-ethyl hexyl fumarate being preferred, said diesters being present in a total amount of from about 20 to about 40 percent by weight; up to about 5 percent by weight, preferably about 1 to 3 percent, of an unsaturated carboxylic acid containing from 3 to about 5 carbon atoms, preferably acrylic and/or methacrylic acid, said emulsion polymer having a glass transition temperature of less than about $-30°$ C. and a gel content of from about 50 to about 70 percent by weight of the polymer.

Although the emulsion adhesive polymers of the instant invention can be prepared by using only conventional surfactants, it is preferred to additionally employ a reactive surfactant which polymerizes and becomes part of the emulsion polymer and which has been observed to enhance cohesive strength and aid in copolymerization of the monomers in forming the emulsion pressure-sensitive adhesive polymers of the instant invention. If employed, the amount of reactive surfactant employed in the preparation of the emulsion pressure-sensitive adhesives of the present invention is present in an amount up to about 0.4 percent by weight of the total monomers, preferably from about 0.1 to about 0.25 percent by weight. The preferred reactive surfactants are anionic vinyl functional surfactants, such as sodium vinyl sulfonate and sodium styrene sulfonate.

The emulsion adhesives of the instant invention may be prepared with excellent conversions at reaction temperatures ranging from 70° to about 85° C. in the presence of from about 0.5 to about 1 percent by weight, based on the weight of the monomers, of a persulfate or equivalent catalyst, with the monomer mix being fed over a period of about 4 to about 5 hours. Reaction pH is from about 2.5 to about 4.0. Conversion is high, approaching 100 percent at the reaction conditions set forth above.

The polymers may be modified using cross-linking reactions induced by metal salts, organometallic complexes, electron beam radiation, actinic radiation, or heat. A significant improvement in cohesive strength can be achieved without much loss of peel and tack by incorporating small amounts of chelating monomers having at least one active methylene group in the pendent chain, with or without a chain transfer agent, and additionally by crosslinking the polymers using metal salts such as aluminum acetate.

DETAILED DESCRIPTION

The present invention relates to pressure-sensitive adhesive compositions based on emulsion polymers which provide high adhesion and high tack to polar, nonpolar and difficult-to-bond substrates with excellent cohesion. The adhesives have properties sufficient to make them useful for replacing solvent polymers, tackified styrene-butadiene emulsion pressure-sensitive adhesives, and nontackified and tackified acrylic pressure-sensitive adhesives. An improvement exhibited over tackified styrene-butadiene resin adhesives include better aging and no edge ooze or bleed as part of a release liner adhesive face stock laminate. In addition, being functional as a single polymer, there is a minimal or no need for compounding and tackification. The improved performance characteristics of the adhesive of the instant invention enable them to be used on almost any available face stock. Properties induced in the adhesive by proper selection of monomers and surfactants give excellent moisture resistance enabling the adhesive to be used for medical and moisture-resistant pressure-sensitive adhesive applications.

As compared to prior art acrylic pressure-sensitive adhesives which do not give good adhesion to nonpolar surfaces, such as polyolefins and certain other surfaces such as recycled corrugated board, without tackification with attendant sacrifice in cohesive strength and low-temperature performance, the adhesives prepared in accordance with the instant invention have excellent adhesion to both polyolefins and corrugated board and good low-temperature performance. The adhesives are more universal in their use, a result not heretofore achieved in single polymer adhesives.

The emulsion based pressure-sensitive adhesives of the instant invention contain, on a percent by weight basis from about 35 to about 60 percent by weight total, one or more alkyl acrylates containing about 4 to about 8 carbon atoms in the alkyl groups, and preferably total alkyl acrylate concentration, including mixtures of alkyl acrylates, preferably present in a total amount of from about 40 to about 50 percent by weight of the monomers. Useful alkyl acrylates include n-butyl acrylate, 2-ethyl hexyl acrylate, isooctyl acrylate, and the like, with 2-ethyl hexyl acrylate being preferred.

The second monomeric component is one or more vinyl esters present in a total amount of from about 15 to about 35 percent by weight, preferably from about 20 to about 25 percent by weight based on total weight of the monomers, said vinyl esters containing from 2 to about 16 carbon atoms in the alkyl group of the acid. Representative of the vinyl esters include vinyl acetate, vinyl butyrate, vinyl propionate, vinyl isobutyrate, vinyl valerate, vinyl versitate, and the like. Vinyl acetate is preferred.

The third component of the emulsion polymers of the instant invention are one or more diesters of a dicarboxylic acid and mixtures thereof, present in a total amount of from about 20 to about 35 percent by weight based on the total weight of the monomers. Each ester group of the diester of the dicarboxylic acid independently contains from about 8 to about 16, preferably from about 8 to about 12, carbon atoms. The preferred diesters are di-2-ethyl hexyl maleate, di-2-ethyl hexyl fumarate and mixtures thereof.

A fourth component of the instant invention is at least one unsaturated carboxylic acid containing from about 3 to about 5 carbon atoms and present in a total amount of up to about 5 percent by weight of the polymer, preferably from 1 to about 3 percent by weight. The unsaturated carboxylic acid includes, among others, acrylic acid, methacrylic acid, itaconic acid, and the like. Acrylic acid, methacrylic acid, and more preferably mixtures thereof, are presently preferred.

The emulsion adhesives of the instant invention are preferably prepared in the presence of a reactive surfactant which polymerizes during formation of the polymer and becomes an integral part of the polymer. Preferred reactive surfactants include anionic vinyl functional monomers such as sodium vinyl sulfonate and sodium styrene sulfonate and the like. The reactive surfactant is present as part of the total surfactant system and in an amount up to about 0.4 percent by weight of the total monomers, preferably about 0.1 to about 0.25 percent by weight.

Presently preferred emulsion polymers contain, exclusive of reactive monomers, about 48 percent by weight 2-ethyl hexyl acrylate, about 21 percent by weight vinyl acetate, about 29 percent by weight di-2-ethyl hexyl maleate, about 1 percent by weight acrylic acid, and about 1 percent by weight methacrylic acid.

The monomer proportions are adjusted in such a way that the adhesive has a glass transition temperature less than about −30° C., preferably less than about −34° C., giving a good balance of adhesion and tack at room temperature and low temperatures. The emulsion polymers of this invention have a very broad glass transition temperature range of from 15° to 30° C., e.g. −22° to −52° C., which is unusual among acrylic polymers. Conventional acrylic polymers, for instance, have a glass transition temperature range of only 10° to 15° C. Depending on polymerization conditions, copolymers showing two distinct glass transition temperatures, one in the region of −45° to −60° C. and the other in the region of −15° to −30° C., have been observed.

Gel content or percent insolubles are in the range of 50 to 65 percent by weight which provides excellent cohesive strength without the use of multifunctional monomers. In this regard, gel represents the amount of polymer which is insoluble in tetrahydrofuran expressed in percent by weight and determined by the membrane gel partitioning method. In this method, about 600 to 800 milligrams of 100 percent solid polymer is weighed onto a millipore membrane disk of 5 micrometer porosity. The disk is heat sealed and transferred to a scintillation vial. About 20 milliliters of tetrahydrofuran is added to the vial and the vial is rotated on a shaker for 16 to 24 hours. The sealed disk is then removed, washed with tetrahydrofuran, and dried first by placing it on a Whatman No. 1 filter paper, followed by exposure to 100° C. in the oven for a few hours. The dried disk is weighed and the insoluble portion of the polymer determined by the equation:

$$\text{Percent insoluble} = \frac{(b - c) \times 100}{a} = \% \text{ gel}$$

wherein a = total weight of 100 percent solids polymer
b = the weight of the polymer plus membrane before tetrahydrofuran treatment
c = polymer plus membrane remaining after tetrahydrofuran treatment.

Polymer properties can be further modified to fit end use applications by inclusion of multifunctional monomers and the use of other chemical cross-linking agents. Other aids which may be used to develop crosslinking include thermal cross-linking and cross-linking by actinic and electron beam radiation.

Polymers of the instant invention are prepared by emulsion polymerization under conditions of agitation in an autogenous atmosphere in the presence of suitable polymerization initiators such as peroxydisulfate and peroxides. Depending on desired polymer properties including gel content, the preferred levels of these initiators are in the range of from about 0.5 to about 1.0 percent by weight based on the total weight of the monomers. The presently preferred initiators are potassium persulfate, t-butyl hydrogen peroxide, and the like. Level of agitation will vary depending on the system and will influence conversion. Typically, about 30 to 50 percent of the total initiator is added along with an initial monomer charge to the reactor, and the rest is added along with the balance monomers during polymerization over a period of from about 4 to about 5 hours. For the polymer to be free from coagulum and to maintain grit levels less than 20 ppm, it is desirable to maintain the pH of the emulsion during polymerization between from about 2 to about 4, preferably from about 2.5 to about 4. This can be achieved by the use of buffers such as sodium bicarbonate and sodium acetate, typically in amounts up to 0.3 percent by weight based on the weight of the monomer.

The stabilizer system used during polymerization contains a combination of anionic and nonionic surfactants present in an amount up to about 3.5 percent by weight based on the weight of the monomers. A suitable anionic surfactant is the sodium salt of an ethoxylated nonylphenol sulfate, and a suitable nonionic surfactant is ethoxylated nonylphenol. The best balance of properties is achieved by maintaining the anionic to nonionic surfactant ratio approximately 3 to 1.

Polymers of the instant invention are produced at high solids level content, typically about 50 to about 70 percent by weight. Reaction is carried out at temperatures from 70° to 85° C. with an initial charge of up to about 10 percent by weight of the total monomers, with the balance of the monomers being added to the emulsion reaction system over a period of about 4 to about 5 hours, with total monomer conversion approaching 100 percent.

It is possible to modify the rheology of the polymer for coating purposes by use of conventional thickeners such as SCT-270 manufactured and sold by Union Carbide and present in an amount up to 0.2 percent by weight. Although not required, it is also feasible to modify the properties by the use of tackifiers and the like. For general purpose applications, it is desirable to have good adhesion to both hydrophobic substrates such as polyethylene and hydrophilic substrates such as stainless steel and difficult-to-bond recycled corrugated board. Prior art acrylic polymers do not have good adhesion to such substrates unless they are modified by addition of a tackifier. This is not required using the pressure-sensitive adhesive polymer of this invention although tackifiers can be effectively used to tailor adhesion to a substrate.

It is also feasible, in accordance with the present invention, to provide emulsion pressure-sensitive adhesive polymers with high shear performance even at elevated temperature with little or no detriment in peel and tack adhesion which can be used to replace high cost solvent acrylic polymers used in film applications. Such polymers can be tackified to enhance adhesion to low energy substrates such as polyolefins even at low temperatures. The dioctyl maleate in the composition provides tackiness to the adhesive and allows the use of vinyl acetate which provides good peel adhesion without the use of high levels of acid monomer which tends to reduce tack.

Improved shear may be achieved by copolymerization with small amounts, i.e., about 0.1 to about 1 percent by weight of the monomers, of functional chelating monomers such as acetoacetoxy ethyl methacrylate (AAEMA), which have a pendent chain with at least one active methylene group, and which enable complex formation with metal salts. As used herein, the term "active methylene group" refers to a functional group capable of exhibiting ketoenol tautomerism and anion formation.

The presence of the chelating monomer in the copolymer itself provides some improvement in shear performance which may not be sufficient enough for high performance film applications. Further cross-linking by complex formation with metal salts dramatically enhances the shear in excess of 10,000 min. Elevated temperature (70° C.) shear is also greatly improved, equalling the performance of the emulsion polymers to solvent acrylic systems. Adding chelating monomers to the copolymer may alter the gel content and/or glass transition temperature of the adhesive. Accordingly, when chelating monomers are used, they are added in an amount that yields an adhesive that is pressure-sensitive, i.e., the glass transition temperature is sufficiently low as to enable use as a PSA. The mechanism of using chelating monomers is described, for instance, in U.S. Pat. No. 4,354,008 to Skoltchi, and U.S. Pat. No. 4,908,403 to Spada, et al., each of which is incorporated herein by reference.

To maintain good balance of peel and tack with high shear it is desirable to lower the molecular weight of the polymer by the use of chain transfer agents such as n-dodecyl mercaptan(n-DDM) and to use higher levels of initiator than what is commonly used. An optimum level of n-DDM in this invention is up to about 0.025 percent by weight of the monomers, preferably about 0.005 to about 0.01 percent by weight, and to employ a level of initiator of about 0.6 to about 0.75 percent by weight based on the weight of the monomer composition. Amounts exceeding these levels can result in cohesive failure in peel adhesion on certain substrates which will be detrimental to the product application. Polymers with low levels of initiator provide high shear with AAEMA and aluminum acetate (AA) cross-linking, but only with loss of peel and tack adhesion. Aluminum acetate, if present, is normally present in an amount up to about 0.25 percent by weight of the monomers. However, the polymer containing the chain transfer agent and a higher level of initiator gives high shear with little or no loss in adhesion properties.

The high shear associated with the modified polymer makes it suitable for tackification with conventional tackifiers such as Snowtack line resins sold by Albright Wilson Co. and Aquatac resins sold by Arizona Chemicals expressly to enhance adhesion to low energy substrates such as polyolefins. For such applications, it is generally necessary to provide a glass transition temperature, e.g., below −30° C. The Tg of the polymer can be as low as −40° C. to promote good adhesion to low energy substrates at low temperatures as low as −5° C. without sacrificing the room-temperature properties. This is done by increasing the ratio of the soft monomer to vinyl acetate in the total composition.

EXAMPLES 1 TO 4 AND CONTROLS 1 AND 2

To a one liter reactor equipped with a reflux condenser, a thermocouple, a pitched turbine agitator and a nitrogen inlet tube, there was charged a solution containing 75 g of deionized water, 4 g of sodium vinyl sulfonate (25 percent w/w solution in water) and 0.36 g of an anionic surfactant (Alipal CO-433, a sodium salt of ethoxylated nonylphenol sulfate manufactured and sold by GAF Chemical Co.). A monomer mix consisting of 215 g of 2-ethyl hexyl acrylate, 150 g of di-2-ethyl hexyl maleate, 125 g of vinyl acetate, 5 g of acrylic acid and 5 g of methacrylic acid was added to 115 g of water containing 44.63 g of Alipal CO-433 and 6.44 g of Igepal CO-887, an ethoxylated nonylphenol nonionic surfactant manufactured and sold by GAF Chemical Co., and agitated to make a pre-emulsion. The reactor charge was heated under nitrogen to 70° C., to which was added 24.25 g of a potassium persulfate solution (3.78 percent w/w solution in deionized water). Sixty-six grams of the preemulsified monomer and 12.125 g of potassium persulfate solution were added to the reactor over 20 to 30 minutes. After the temperature reached a steady state, the remaining monomer pre-emulsion and a 1.8 percent aqueous solution of potassium persulfate buffered with sodium bicarbonate were introduced into the reactor at respective rates of 2.5 and 0.32 g/min. for a period of about 240 minutes. The reactor temperature was maintained between 79° to 82° C. After the end of feed, the reactor temperature was raised to 83° to 85° C. and maintained for 90 minutes. Once the polymerization was complete, the contents were cooled to ambient temperature and discharged. The polymer had 59.27 percent solids, 0.01 percent coagulum, Brookfield viscosity (spindle number 3 at 12 rpm) of 2500 cps, a final pH of 3.8, and a Tg of −28.5° C.

Using the above procedure the polymers listed in Table 1 were also prepared.

TABLE 1

| Monomer Composition | Weight Ratio | Percent Solids | pH |
|---|---|---|---|
| EX. 2 2-EHA[1]/DOM[2]/VAc[3]/AA[4] | 43/30/25/2 | 59.7 | 4.35 |
| Ex. 3 2-EHA/DOM/VAc/AA/MAA[5] | 48/29/21/1/1 | 59.6 | 3.80 |
| Ex. 4 2-EHA/DOM/VAc/AA/MAA | 50/27/21/1/1 | 59.3 | 3.54 |

[1]2-ethyl hexyl acrylate
[2]dioctyl maleate
[3]vinyl acetate
[4]acrylic acid
[5]methacrylic acid Similar polymers were made using the same procedure, but replacing Alipal CO-433 with Polystep B-27, manufactured and sold by Stepan Chemicals, and replacing Igepal CO-887 with Polystep F-9, also manufactured and sold by Stepan Chemicals.

Table 2 compares the adhesive performance of the adhesive of Example 3 to commercial pressure-sensitive adhesive (Controls 1 and 2) at room temperature. Better overall properties and superior room-temperature shear were achieved.

TABLE 2

|  | Ct. Wt. g/sqm | 90° peel N/m[8] | | | Loop Tack N/m[9] | | | RTS[10] Min. |
|---|---|---|---|---|---|---|---|---|
|  |  | SS[11] | PE[12] | CB[13] | SS | PE | CB |  |
| Ex. 3 | 22–25 | 480 | 330 | 280 | 740 | 520 | 360 | 140 c |
| Control 1[6] | 23–26 | 310 | 350 | 150 | 650 | 525 | 300 | 30 c |
| Control 2[7] | 23–26 | 710 c | 230 | 315 c | 720 | 460 | 400 | 5 c |

[6]Tackified SBR adhesive
[7]Cargill 6441, a commercial polymer sold by Cargill Inc. and containing the same monomers used in this invention
c = cohesive failure
[8]PSTC No. 2, 5th Ed.
[9]PSTC No. 5, 6th Ed.
[10]Room-temperature shear = PSTC No. 7, 6th Ed. (500 g load)
[11]Stainless steel
[12]Treated high density Polyethylene
[13]Recycled corrugated board Tackified SBR (Control 1) shows a lower adhesion to corrugated board and has a low cohesive strength. Besides this, Control 1 had a tendency to exhibit bleed and edge ooze on aging, which make the adhesive nonuseful with certain face stocks. The Cargill 6441 (Control 2) lacked cohesive strength and displayed a cohesive mode of failure for peel adhesion, which make it of questionable acceptability for label applications.

EXAMPLES 5 AND 6

Experiments were performed with and without a reactive surfactant, i.e. sodium vinyl sulfonate (SVS), to establish its effects on shear performance.

As can be seen from Table 3, Example 5 gives room-temperature shear values comparable to Example 3, whereas Example 6, containing no SVS, gives lower shear values.

TABLE 3

| Sample | Percent Solids | 90° Peel N/m SS | L. Tack N/m SS | RTS[a] Min. SS |
|---|---|---|---|---|
| Ex. 5 | 59.8 | 370 | 670 | 130 c |
| Ex. 6 | 59.8 | 355 | 700 | 58 c |

[a]500 g load

There is an apparent improvement in shear for the polymer with the use of SVS. SVS has been observed to also control the viscosity of the emulsion polymer to accommodate high solids and for good conversion. With no SVS, the viscosity is less consistent and is higher than the polymer prepared using SVS (5000 to 15000 cps vs. 3000 to 5000 cps).

Control 3

Further experiments with the composition of the present invention have been carried out to obtain gel content similar to that of the Cargill 6441 polymer for a better comparison.

To obtain Control 3, therefore, Example 3 was repeated with the difference that the preemulsion contained 0.125 g of n-dodecyl mercaptan, a chain transfer agent, the total initiator was 5 g and the total feed time was 270 minutes. Table 4 provides the comparative properties of Examples 1 and 3 to each other and to the Cargill 6441 polymer and the polymer of Control 3. Examples 1 and 3 give very good room-temperature performance with good shear. The polymer of Control 3, with a lower gel content similar to Cargill 6441, had a very low shear performance combined with cohesive mode of failure for peel adhesion.

Table 4 shows the low-temperature performance obtained for the pressure-sensitive adhesives of the present invention compared to Example 1 and Control 3 and the Cargill 6441. Example 3 shows good adhesion and good fiber pick on recycled corrugated board, and good adhesion and face stock tear on treated high density polyethylene. Example 1, with higher Tg, had better room-temperature performance than low-temperature performance. Control 3 and Cargill 6441, with low cohesion, showed only fair adhesion.

TABLE 4

| | Low-Temperature Performance Properties | | | | |
|---|---|---|---|---|---|
| | | | | 25° Peel Adhesion[13] | |
| | Ct. Wt. | | | | |
| Period | g/sqm | % Gel | Tg, °C. | RCB | TRHDPE |
| Ex. 1 | 26 | 53 | −28 | F-P/CL | F/CL |
| Ex. 3 | 23 | 58 | −34 | G/GFP | G/SlFT |
| Control 3 | 23 | 25 | −36 | F/SIFT | F/CL |
| Cargill 6441 | 23 | 20 | −27 | F/VslFP | F/CL |

[13]practical peel adhesion determined by subjective hand testing
RCB = recycled corrugated board
TRHDPE = treated high density polyethylene
G = good adhesion
F = fair adhesion
P = poor adhesion
CL = removes clean
GFP = good fiber pick
VslFP = very slight fiber pick
SlFT = slight face tear

EXAMPLES 7 TO 11 AND CONTROLS (CTL) 4 TO 6

To a one liter reactor equipped with a reflux condenser, a thermocouple, a pitched turbine agitator and a nitrogen inlet tube, there was charged a solution containing 75 g of deionized water, 2 g of sodium vinyl sulfonate (25 percent solution in water) and 0.36 g of Polystep F-27 emulsifier. A monomer mix consisting of 237.5 g of 2-ethyl hexyl acrylate (2-EHA), 145 g of dioctyl maleate (DOM), 105 g of vinyl acetate (VA), 7.5 g of acrylic acid (AA), 2.5 g of methacrylic acid (MAA), 2.5 g of acetoacetoxy ethyl methacrylate (AAEMA), and 0.25 g of n-dodecyl mercaptan (n-DDM) was added to 115 g of water containing 44.63 g of Polystep B-27 and 6.44 g of Polystep F-9 and agitated to make a pre-emulsion. The reactor charge was heated to 72° to 75° C. and there was added 24.25 g of 4.37 percent w/w of potassium persulfate solution. Sixty-six grams of the pre-emulsified monomer and 12.13 g of the potassium persulfate solution were added over 20 to 30 minutes. After the temperature reached a steady state, the remaining monomer pre-emulsion and a 2.21 percent aqueous solution of potassium persulfate buffered with sodium bicarbonate were introduced into the reactor at respective rates of 2.22 and 0.29 g/min. over a period of 270 minutes. The reaction temperature was maintained between 79° to 82° C. After the end of feed, process temperature was raised to 83° to 85° C. Thirty minutes after the feed, 5.25 g of a 4.8 percent solution of potassium persulfate was added and the reactants maintained for 90 minutes. Once the polymerization was complete, the contents were cooled to ambient temperature, neutralized with ammonia to pH 5.5 to 6.5, and discharged. The polymer content was 60 percent solids, with less than 0.02 percent coagulum. Polymer Tg was −35° C.

Using the same procedure, the polymers listed in Table 5 were prepared, except for examples 10 and 11 where the initial charge had 3.85 percent solution of initiator and the main feed had 1.9 percent solution of initiator.

TABLE 5

| Example | Monomer Composition | Wt. Ratio | Percent Solids |
|---|---|---|---|
| Ex. 8 | 2-EHA/DOM/Vac/ n-DDm/AA/MAA | 48/29/21/0.005/ 1.5/0.5 | 59.0 |
| Ex. 9 | 2-EHA/COM/VAc/ AAEMA/AA/MAA/ n-DDm/BA | 47.5/25/17/0.5/ 1.5/0.5/0.005/8 | 59.5 |
| Ex. 10 | 2-EHA/DOM/VAc/ BA/AA/MAA/n-DDM | 48/24/16/10/1.5/ 0.5/0.005 | 58.9 |
| Ex. 11 | 2-EHA/DOM/VAc/ AA/MAA/AAEMA | 48/29/20.5/1/ 1/0.5 | 59.3 |

Table 6 shows the adhesive properties of Examples 7 to 11 against, for purposes of these Examples, controls which are polymers made by the procedure of Example 11 with similar composition but not containing n-DDM or AAEMA. As in all other examples, shear was measured using a sample measuring $\frac{1}{2}'' \times \frac{1}{2}''$. Shear values (both RTS and 70° C. shear) were determined using a 500 g load, and measured in minutes. The polymers of Examples 7 to 11 show better overall properties. Example 2 and 10, with no AAEMA and with only ionic cross-linking with aluminum acetate (AA), gave shear values much less than Example 7. Example 11, containing no n-DDm and polymerized with a lesser level of initiator, had a good shear value, although the adhesion properties were lower. In the Controls, the improvement of shear is not dramatic, and just cross-linking with aluminum acetate reduces adhesion values. A combination of chain transfer agent (n-DDM) and the higher level of initiator give low molecular weight polymers which provide good adhesion values and high shear.

TABLE 6

| | Ct. Wt. g/sqm | AA Wt. % | AAEMA Wt. % | 90° Peel N/m | Loop Tack N/m | RTS, Min. | 70° C. Shear Min. |
|---|---|---|---|---|---|---|---|
| Ex. 7 | 23 | 0.06 | 0.5 | 295 | 510 | 10000+ | 4000+ |
| Ex. 8 | 23 | 0.15 | — | 295 | 480 | 1600 | — |
| Ex. 9 | 23 | 0.15 | 0.5 | 245 | 310 | 10000+ | — |
| Ex. 10 | 23 | 0.15 | — | 250 | 353 | 2300 | — |
| Ex. 11 | 28 | 0.06 | 0.5 | 240 | 400 | 7000+ | — |
| Ctl. 4 | 21 | 0.06 | — | 250 | 320 | 600 | — |
| Ctl. 5 | 23 | 0.20 | — | 250 | 340 | 2200 | — |

TABLE 6-continued

| | Ct. Wt. g/sqm | AA Wt. % | AAEMA Wt. % | 90° Peel N/m | Loop Tack N/m | RTS, Min. | 70° C. Shear Min. |
|---|---|---|---|---|---|---|---|
| Ctl. 6 | 27 | — | — | 330 | 540 | 210 | — |

Release liner = 1100
Face stock = 2 mil Mylar

EXAMPLES 12 TO 19

Using the general procedure described above, additional emulsion polymers were made by varying the amount of monomers and acetoacetoxy ethyl methacrylate, as shown in weight percent in Table 7. The initiator level was maintained between 0.6 and 0.7% based on the total monomer weight, and the n-dodecyl mercaptan level was maintained below 0.015% by weight.

TABLE 7

| Ex. | 2-EHA | VAC | DOM | AA | MAA | AAEMA | Other Monomers |
|---|---|---|---|---|---|---|---|
| 12 | 47.75 | 21 | 29 | 1.5 | 0.5 | 0.25 | — |
| 13 | 47.9 | 21 | 29 | 1.5 | 0.5 | 0.1 | — |
| 14 | 48 | 21 | 28 | 2 | 1 | 0.15 | — |
| 15 | 43 | 25 | 29 | 2 | 1 | 0.15 | — |
| 16 | 48 | 20 | 28 | 1.5 | 1.5 | 0.1 | 1.0 t-octyl acrylamide |
| 17 | 43 | 25 | 27.55 | 1.5 | 0.5 | 0.15 | 0.3 amide, 2 HPA |
| 18 | 43 | 25 | 29.65 | 1.5 | 0.5 | 0.15 | 0.2 MAEEU |
| 19 | 52.4 | 20 | 24.85 | 2 | 0.75 | 0.15 | — |

Amide = Acrylamide
HPA = Hydroxypropyl acrylate
MAEEU = Methacrylamide of aminoethyl ethylene urea The emulsion polymers were coated and dried, and tested using polyester facestock in pressure-sensitive adhesive construction. Table 8 gives the initial and one week at 70° C. aged performance data on a stainless steel test panel. All of the polymers show good adhesion with high cohesion. Even the polymers containing low levels of acetoacetoxy ethyl methacrylate (e.g., example 13) show shear values in excess of 6000 minutes. The plus sign after the shear values indicate that the samples were removed after that time and that the test was discontinued.

TABLE 8

| | | 180° Peel N/m | | Loop Tack N/m | | RTS |
|---|---|---|---|---|---|---|
| Ex. | Ct. Wt. g/sqm | 20 Min | 1/Wk, @70° C. | Init. | 1/Wk, @70° C. | 500 g Min. |
| 12 | 25 | 450 | 350 | 485 | 330 | 10000+ |
| 13 | 27 | 570 | — | 485 | — | 6000+ |
| 14 | 30 | 450 | 350 | 600 | 360 | 6000+ |
| 15 | 25 | 470 | 380 | 600 | 370 | 5000+ |
| 16 | 25 | 520 | 445 | 500 | 500 | 2000–4000 |
| 17 | 25 | 420 | 355 | 390 | 235 | — |
| 18 | 24 | 455 | 480 | 480 | 440 | 10000+ |
| 19 | 24 | 350 | — | 425 | — | 10000+ |

What is claimed is:

1. The process for the production of inherently tacky, pressure-sensitive adhesive emulsion polymers which comprises:
   subjecting an emulsified mix of monomers comprising:
   (i) at least one alkyl acrylate containing from about 4 to about 8 carbon atoms in the alkyl group and present in a total amount of 35 to about 65 percent by weight of the monomers;
   (ii) at least one vinyl ester containing from about 2 to about 16 carbon atoms in the alkyl chain of the acid, the total of the vinyl esters being present in an amount of 15 to about 35 percent by weight of the monomers;
   (iii) at least one diester of a dicarboxylic acid present in a total amount of from about 20 to about 35 percent by weight of the monomers, each diester independently containing from 8 to about 16 carbon atoms in the alkyl group of the ester; and
   (iv) up to about 5 percent by weight of the monomers of at least one unsaturated carboxylic acid;
   (v) a positive amount of a celating monomer having a pendant chain which contains at least one active methylene group
   to emulsion polymerization by initiating polymerization of an initial monomer mix consisting of a portion of the total monomers in the presence of an initiator, and adding the balance of the monomers and the initiator therefore to the emulsion reaction system over a period sufficient to achieve a total solids content up to about 60 percent by weight of the emulsion, said emulsion reaction being maintained under autogenous conditions at a temperature of about 70° to about 85° C. and a pH of from about 2 to about 4 in the presence of a stabilizer system comprising a reactive surfactant which is a vinyl function monomer and an anionic and a nonionic surfactant system, in which the anionic-to-nonionic surfactant ratio is approximately about 3 to about 1, said polymer having a glass transition temperature of less than about −30° C. and having a gel content of about 50 to about 70 percent by weight.

2. A process as claimed in claim 1 in which the emulsion is carried out at a pH of from about 2.5 to about 4.

3. A process as claimed in claim 1 in which the reactive surfactant is selected from the group consisting of sodium vinyl sulfonate and sodium styrene sulfonate.

4. A process as claimed in claim 1 in which the chelating monomer is present in an amount of from about 0.1 to about 1 percent by weight of the monomers and in which a chain transfer agent is present in an amount of from about 0 to about 0.25 percent by weight of the monomers.

5. A process as claimed in claim 4 in which the chelating monomers is acetoacetoxy ethyl methacrylate.

6. A process as claimed in claim 4 in which the chain transfer agent is dodecyl mercaptan.

7. A process as claimed in claim 6 in which the chelating monomer is acetoacetoxy ethyl methacrylate.

* * * * *

UNITED STATES PATENT AND TRADEMARK OFFICE
CERTIFICATE OF CORRECTION

PATENT NO. : 5,278,227
DATED : January 11, 1994
INVENTOR(S) : Margaret M. Bernard It is certified that error appears in the above-indentified patent and that said Letters Patent is hereby corrected as shown below:

Column 8, line 5, Table 1, in Ex. 2 change
"$VAc^3/AA^4$" to -- $VAC^3/AA^4$ --.
Column 8, line 6, Table 1, in Ex. 3 change
"2-EHA/DOM/VAc/" to -- 2-EHA/DOM/VAC/ --.
Column 8, line 8, Table 1, in Ex. 4 change
"2-EHA/DOM/VAc/" to -- 2-EHA/DOM/VAC/ --.

Column 10, line 28, Table 5, in Ex. 8 change
"2-EHA/DOM/Vac/" to -- 2-EHA/DOM/VAC/ --.
Column 10, line 30, Table 5, in Ex. 9 change
"2-EHA/COM/VAc/" to -- 2-EHA/COM/VAC/ --.
Column 10, line 33, Table 5, in Ex. 10 change
"2-EHA/COM/VAc/" to -- 2-EHA/COM/VAC/ --.
Column 10, line 34, Table 5, in Ex. 11 change
"2-EHA/COM/VAc/" to -- 2-EHA/COM/VAC/ --.

Signed and Sealed this

Eighteenth Day of October, 1994

Attest:

BRUCE LEHMAN

*Attesting Officer*      *Commissioner of Patents and Trademarks*